(12) United States Patent
Wang et al.

(10) Patent No.: US 11,055,265 B2
(45) Date of Patent: Jul. 6, 2021

(54) SCALE OUT CHUNK STORE TO MULTIPLE NODES TO ALLOW CONCURRENT DEDUPLICATION

(71) Applicant: VMware, Inc., Palo Alto, CA (US)

(72) Inventors: Wenguang Wang, Santa Clara, CA (US); Junlong Gao, Mountain View, CA (US); Marcos K. Aguilera, Palo Alto, CA (US); Richard P. Spillane, Mountain View, CA (US); Christos Karamanolis, Los Gatos, CA (US); Maxime Austruy, Lausanne (CH)

(73) Assignee: VMware, Inc., Palo Alto, CA (US)

( * ) Notice: Subject to any disclaimer, the term of this patent is extended or adjusted under 35 U.S.C. 154(b) by 127 days.

(21) Appl. No.: 16/552,880

(22) Filed: Aug. 27, 2019

(65) Prior Publication Data
US 2021/0064589 A1 Mar. 4, 2021

(51) Int. Cl.
*G06F 16/00* (2019.01)
*G06F 16/215* (2019.01)
*G06F 16/22* (2019.01)

(52) U.S. Cl.
CPC ........ *G06F 16/215* (2019.01); *G06F 16/2255* (2019.01)

(58) Field of Classification Search
CPC .... G06F 16/134; G06F 16/137; G06F 16/215; G06F 16/2255; G06F 9/5066
See application file for complete search history.

(56) References Cited

U.S. PATENT DOCUMENTS

| | | | |
|---|---|---|---|
| 2007/0038658 A1* | 2/2007 | Ghosh | G06F 16/24532 |
| 2007/0116025 A1* | 5/2007 | Yadlon | H04L 47/50 370/412 |
| 2015/0205816 A1* | 7/2015 | Periyagaram | G06F 3/067 707/827 |
| 2017/0270135 A1* | 9/2017 | Lambright | G06F 16/1752 |
| 2018/0150562 A1* | 5/2018 | Gundimeda | G06F 16/951 |
| 2018/0173732 A1* | 6/2018 | Wu | G06F 16/2365 |

OTHER PUBLICATIONS

Bonwick, Jeff, ZFS Deduplication. https://blogs.oracle.com/bonwick/zfs-deduplication-v2, Nov. 2, 2009.
Colgrove, John et al., Purity: Building Fast, Highly-Available Enterprise Flash Storage from Commodity Components. In Proceedings of SIGMOD 2015: Industrial Track, May 2015.
(Continued)

*Primary Examiner* — Diedra McQitery
(74) *Attorney, Agent, or Firm* — Patterson + Sheridan, LLP

(57) ABSTRACT

The present disclosure provides techniques for scaling out deduplication of files among a plurality of nodes. The techniques include designating a master component for the coordination of deduplication. The master component divides files to be deduplicated among several slave nodes, and provides to each slave node a set of unique identifiers that are to be assigned to chunks during the deduplication process. The techniques herein preserve integrity of the deduplication process that has been scaled out among several nodes. The scaled out deduplication process deduplicates files faster by allowing several deduplication modules to work in parallel to deduplicate files.

20 Claims, 8 Drawing Sheets

(56) References Cited

OTHER PUBLICATIONS

Decandia, Giuseppe et al., Dynamo: Amazon's Highly Available Key-value Store. SIGOPS Oper. Syst. Rev., 41 (6):205-220, Oct. 2007.

El-Shimi, Ahmed et al., Primary Data Deduplication—Large Scale Study and System Design. In Presented as part of be 2012 USENIX Annual Technical Conference (USENIX ATC 12), pp. 285-296, Boston, MA, 2012. USENIX.

Gao, Junlong et al., BOSSFS: An Enterprise File Service as Fast as vSAN and as Cheap as S3. In Proceedings of VMware RADIO 2018, May 2018.

Gueron, Shay et al., SHA-512/256. In Proceedings of the 2011 Eighth International Conference on Information Technology: New Generations, ITNG '11, pp. 354-358, Washington, DC, USA, 2011. IEEE Computer Society.

Gupta, Abhishek et al., A Highly Concurrent and IO-Parallel B-Tree. In Proceedings of VMware RADIO 2018, May 2018.

Intel. Isa-I performance report release 2.19. https://01.org/sites/default/files/documentation/intel_isa-1_2.19_performance_report_0_pdf, Sep. 29, 2017.

Leung, Andrew W. et al., Measurement and Analysis of Large-Scale Network File System Workloads. In USENIX 2008 Annual Technical Conference, ATC'08, pp. 213-226, Berkeley, CA, USA, 2008. USENIX Association.

Lu, Luke et al., VDFS: A Cloud-Centric Virtual Distributed File System. In Proceedings of VMware RADIO 2015, May 2015.

Muthitacharoen, Athicha et al., A Low-bandwidth Network File System. In Proceedings of the Eighteenth ACM Symposium on Operating Systems Principles, SOSP '01, pp. 174-187, New York, NY, USA, 2001. ACM.

Introduction to VMware vSAN, VMware, Apr. 14, 2017. https://www.youtube.com/watch?v=g8S3UT_vvUo.

Patrizio, Andy, IDC: Expect 175 zettabytes of data worldwide by 2025. https://tinyurl.com/y9494x9o, Dec. 3, 2018.

Roselli, Drew et al., Characteristics of File System Workloads. Technical Report UCB/CSD-98/1029, EECS Department, University of California, Berkeley, 1998.

Roselli, Drew et al., A Comparison of File System Workloads. Proceedings of 2000 USENIX Annual Technical Conference, ATEC'00, pp. 1-15, San Diego, CA, USA, Jun. 18-23, 2000. USENIX Association.

Stoica, Ion et al., Chord: A Scalable Peer-to-Peer Lookup Service for Internet Applications. SIGCOMM Comput. Commun. Rev., 31(4):149-160, Aug. 2001.

Zaydman, Oleg et al., Teleportation of VM Disk Images over WAN, In Proceedings of VMware RADIO 2018, May 2018.

Zhu, Benjamin et al., Avoiding the Disk Bottleneck in the Data Domain Deduplication File System. In Proceedings of the 6th USENIX Conference on File and Storage Technologies, FAST'08, pp. 18:1-18:14, Berkeley, CA, USA, 2008. USENIX Association.

\* cited by examiner

SCALE OUT CHUNK STORE TO MULTIPLE NODES TO ALLOW CONCURRENT DEDUPLICATION

RELATED APPLICATIONS

This application is related to U.S. application Ser. No. 16/552,998, titled "ORGANIZE CHUNK STORE TO PRESERVE LOCALITY OF HASH VALUES AND REFERENCE COUNTS FOR DEDUPLICATION," U.S. application Ser. No. 16/552,908, titled "A PROBABILISTIC ALGORITHM TO CHECK WHETHER A FILE IS UNIQUE FOR DEDUPLICATION," U.S. application Ser. No 16/552,954, titled "EFFICIENT GARBAGE COLLECTION OF VARIABLE SIZE CHUNKING DEDUPLICATION," U.S. application Ser. No. 16/552,965, titled "FAST ALGORITHM TO FIND FILE SYSTEM DIFFERENCE FOR DEDUPLICATION," and U.S. application Ser. No. 16/552,976, titled "SMALL IN-MEMORY CACHE TO SPEED UP CHUNK STORE OPERATION FOR DEDUPLICATION." Each of these applications is filed on the same day as the present application. The entire contents of each of these applications are hereby incorporated by reference herein.

BACKGROUND

The amount of data worldwide grows each year at a rate that is faster than the price drop of storage devices. Thus, the total cost of storing data continues to increase. As a result, it is increasingly important to develop and improve data efficiency techniques, such as deduplication and compression for file and storage systems. Data deduplication works by calculating a hash value for each data unit and then storing units with the same hash only once. However, as a deduplication system scales out and becomes distributed, challenges of maintaining system integrity arise.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques for scaling out deduplication of files among a plurality of nodes. The techniques include designating a master component for the coordination of deduplication. The master component divides files to be deduplicated among several slave nodes, and provides to each slave node a set of unique identifiers that are to be assigned to chunks during the deduplication process. The techniques herein preserve integrity of the deduplication process that has been scaled out among several nodes. The scaled out deduplication process deduplicates files faster by allowing several deduplication modules to work in parallel to deduplicate files. An improvement in deduplication improves the way a computer stores and retrieves data in memory and in storage. The deduplication techniques herein are directed to a specific implementation of a solution to a problem in the software arts.

The techniques also include creating a data structure that organizes metadata about chunks of files, the organization of the metadata preserving order and locality of the chunks within files. A chunk of a file is a portion of a file, as described further below. Order and locality are further described below with reference to FIG. 1C and FIG. 2. The organization of the metadata within storage blocks of storage devices matches the order of chunks within files. Upon a read or write operation to a metadata, the preservation of locality of metadata results in the likely pre-fetching, from storage into a memory cache, metadata of subsequent and contiguous chunks. The preserved locality results in faster subsequent read and write operations of metadata, because the read and write operations are executed from memory rather than from storage.

The faster read and write operations result in an improvement in the functioning of the computer itself. The computer is able to execute basic read and write operations faster than otherwise. Additionally, an improvement in a deduplication process results in an improvement in the functioning of the computer itself. An improvement in deduplication improves the way a computer stores and retrieves data in memory and in storage. The deduplication techniques herein are directed to a specific implementation of a solution to a problem in the software arts.

Figure 1A:
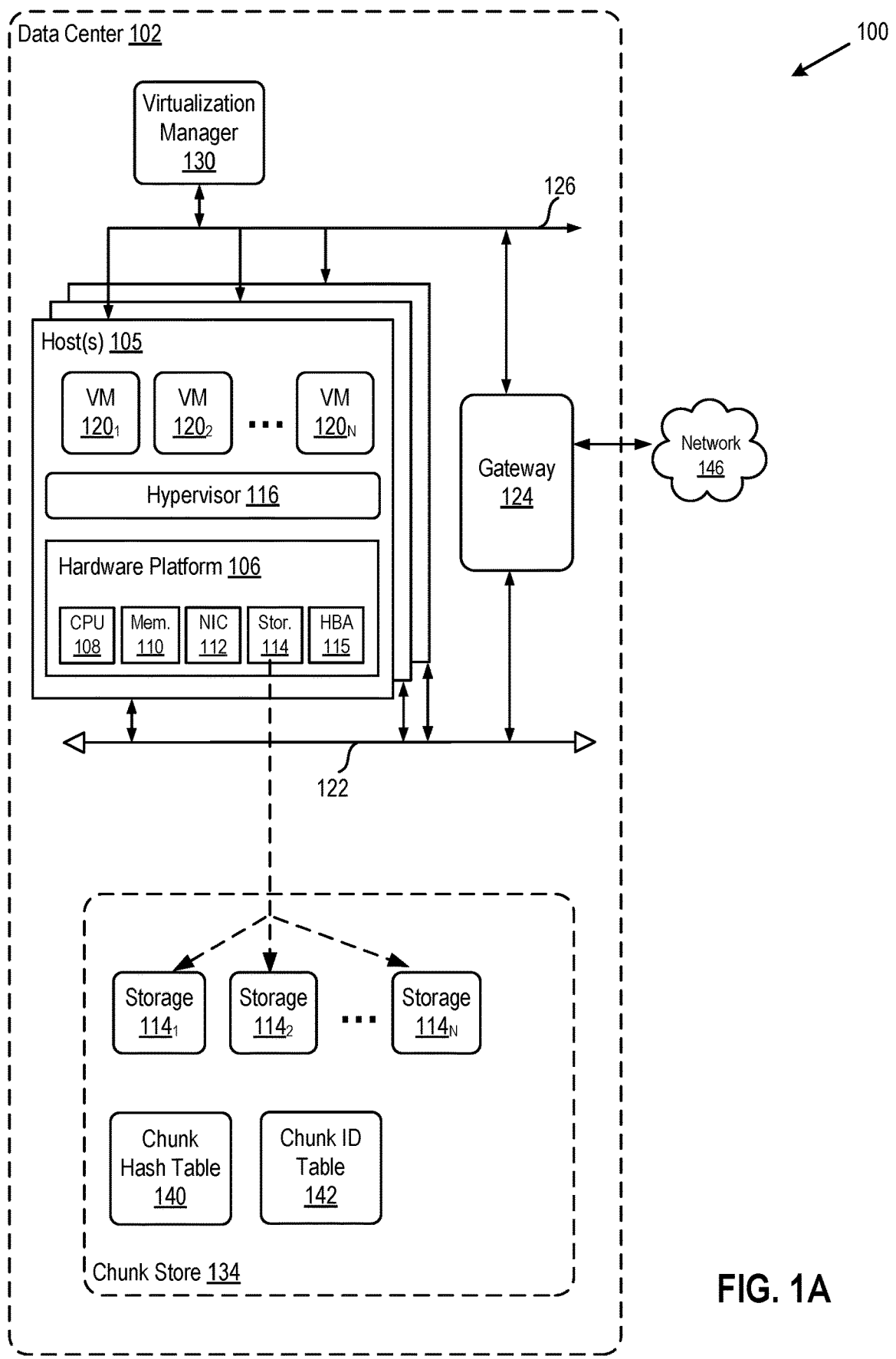
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Computer system 100 includes a data center 102 connected to a network 146. Network 146 may be, for example, a direct link, a local area network (LAN), a wide area network (WAN) such as the Internet, another type of network, or a combination of these.

Data center 102 includes host(s) 105, a virtualization manager 130, a gateway 124, a management network 126, a data network 122, and a chunk store 134. Networks 122, 126, in one embodiment, each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack.

Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 enables host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 represents persistent storage devices (e.g., one or more hard disks, flash memory modules, solid state disks, non-volatile memory express (NVMe) drive, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Figure 1B:
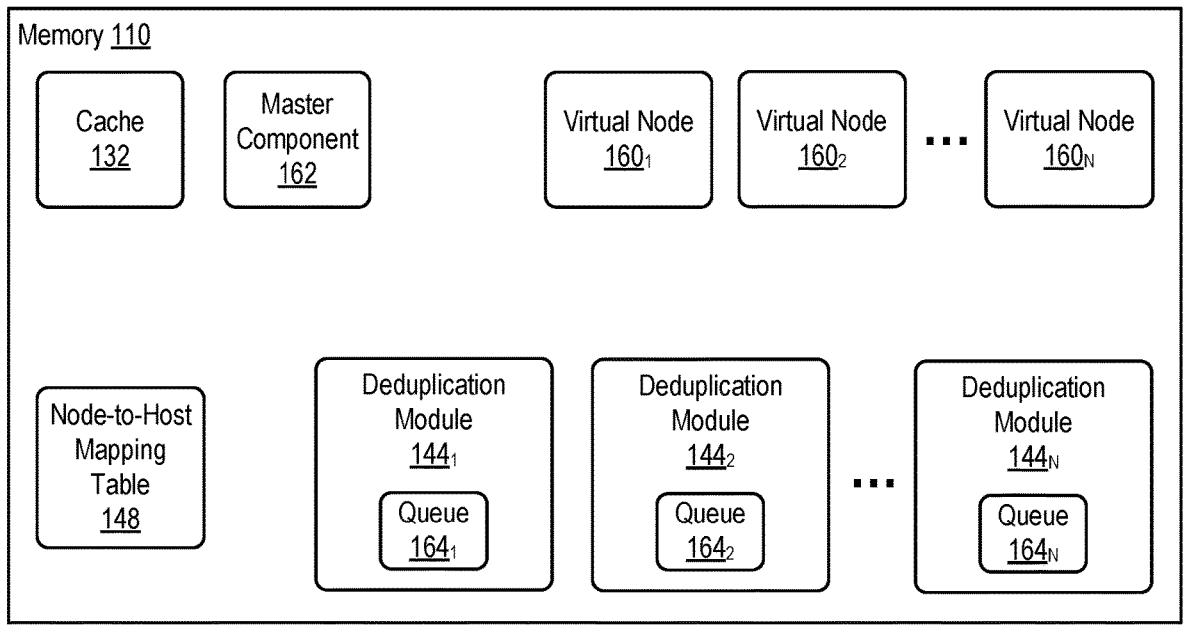
FIG. 1B depicts a block diagram of exemplary contents of a memory of a host machine, according to an embodiment.

FIG. 1B depicts a block diagram of exemplary contents of memory 110, according to an embodiment. System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 includes a cache 132, a node-to-host mapping table 148, one or more virtual nodes 160, a master component 162, and one or more deduplication modules 144.

Although cache 132 is shown as located within memory 110, cache 132 may be implemented in other components of computer system 100, such as in an external storage or memory device, shared by a plurality of hosts 105, and coupled to host 105 via HBA 115 or NIC 112. Cache 132 comprises cached copies of storage blocks of storage(s) 114. The cached storage blocks in cache 132 are fetched into memory 110 during deduplication method 300 discussed below with reference to FIG. 3.

A virtual node 160 is an executable software, such as an application, that may be associated with (a) a portion of chunk hash table 140, (b) a portion of chunk ID table 142, and/or (c) a deduplication module 144.

The association between virtual node 160 and deduplication module 144 may be a pairwise association. Each "virtual node-deduplication module" pair may execute on the same physical host 105. For example, virtual node $160_1$ may be associated with deduplication module $144_1$, virtual node $160_2$ may be associated with deduplication module $144_2$, etc. If a deduplication module 144 is associated with a virtual node 160, then the associated deduplication module 144 may accept requests and commands from that virtual node to perform deduplication on indicated files 200 (see FIG. 2). Association between a virtual node 160 and portions of chunk hash table 140 and portions of chunk ID table 142 is discussed below with reference to FIG. 2. Virtual node 160 may execute within VM 120 of host 105 or directly on host 105 (e.g., on a host OS (not shown)) outside of a VM 120. Each virtual node 160 may have a unique alphanumeric identifier within system 100.

In an embodiment, a virtual node 160 is the smallest unit of workload distribution. A virtual node 160 is used to distribute workload to many physical nodes (e.g., hosts 105), and the number of physical nodes may change. The number of virtual nodes 160 may be more than the number of physical nodes, such as for example, ten times more virtual nodes 160 than physical nodes. This allows smooth load balancing when physical nodes join or leave system 100.

Node-to-host mapping table 148 maps virtual node 160 to host 105 on which the virtual node is located. In an embodiment, a full copy of the node-to-host mapping table 148 is located on each host 105. If, for example, a component of a first host 105 would like to communicate with a virtual node 160 located on a second host 105, the component may reference node-to-host mapping table 148 to learn on which host 105 the virtual node 160 is located.

Master component 162 is a component of system 100 that coordinates concurrent deduplication of files 200, the concurrent deduplication being performed by a plurality of deduplication modules 144. Master component 162 may be one of virtual nodes 160, or may be another component of system 100. In an embodiment, a master component 162 is not present on each host 105, but is present on only one host 105 or only on some hosts 105. Master component 162 may execute within one of VMs 120 or directly on host 105 (e.g., on a host OS (not shown)) outside of VM 120. Master component 162 is further discussed below with reference to FIGS. 5 and 6.

Returning to FIG. 1A, host 105 is configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 communicates with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 provides hosts 105, VMs 120 and other components in data center 102 with connectivity to one or more networks used to communicate with one or more remote data centers. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Chunk store 134 comprises storages 114, and tables 140, 142. Chunk store 134 is a storage system that stores data of files 200 (see FIG. 2). The data of files 200 within chunk store 134 is deduplicated by one or more deduplication modules 144.

Deduplication module 144 may be a background process working asynchronously relative to input/output (I/O) operations directed to chunk store 134, such as asynchronously relative to I/O operations by hosts 105 or VMs 120. Deduplication module 144 may be software running within hypervisor 116, memory 110, VM 120, storage 114, or within another component of system 100. Deduplication module 144 may be a separate physical device. Deduplication module 144 comprises a queue 164 of files 200 that deduplication module 144 has been assigned to deduplicate by mast component 162, as per method 500 of FIG. 5. Queue 164 is further discussed below with reference to FIGS. 3, 6, and 7.

One method of deduplication that may be used by deduplication module 144 is described in U.S. application Ser. No. 12/356,921, titled "Computer Storage Deduplication," filed on Jan. 21, 2009, the entire content of which is hereby incorporated by reference herein. The method of deduplication that may be used by deduplication module 144 may be that described in application Ser. No. 12/356,921, as modified by techniques disclosed herein.

Chunk store 134 comprises one or more storage devices 114. Although the storage devices of chunk store 134 are shown as storage devices 114 of host 105, storage devices of chunk store 134 may be any storage devices such as other storages that may be connected to host 105 through HBA 115. In an embodiment, chunk store 134 may be a distributed storage system implemented as an aggregation of storage devices 114 accessible by a plurality of hosts 105. In such a distributed storage system, chunk store 134 may be a virtual storage area network (vSAN), and hypervisor 116 may comprise a vSAN module (not shown), as described in U.S. application Ser. No. 14/010,247, titled "Distributed Policy-Based Provisioning and Enforcement for Quality of Service," filed on Aug. 26, 2013, now U.S. Pat. No. 9,887,924, the entire content of which is hereby incorporated by reference herein.

Figure 2:
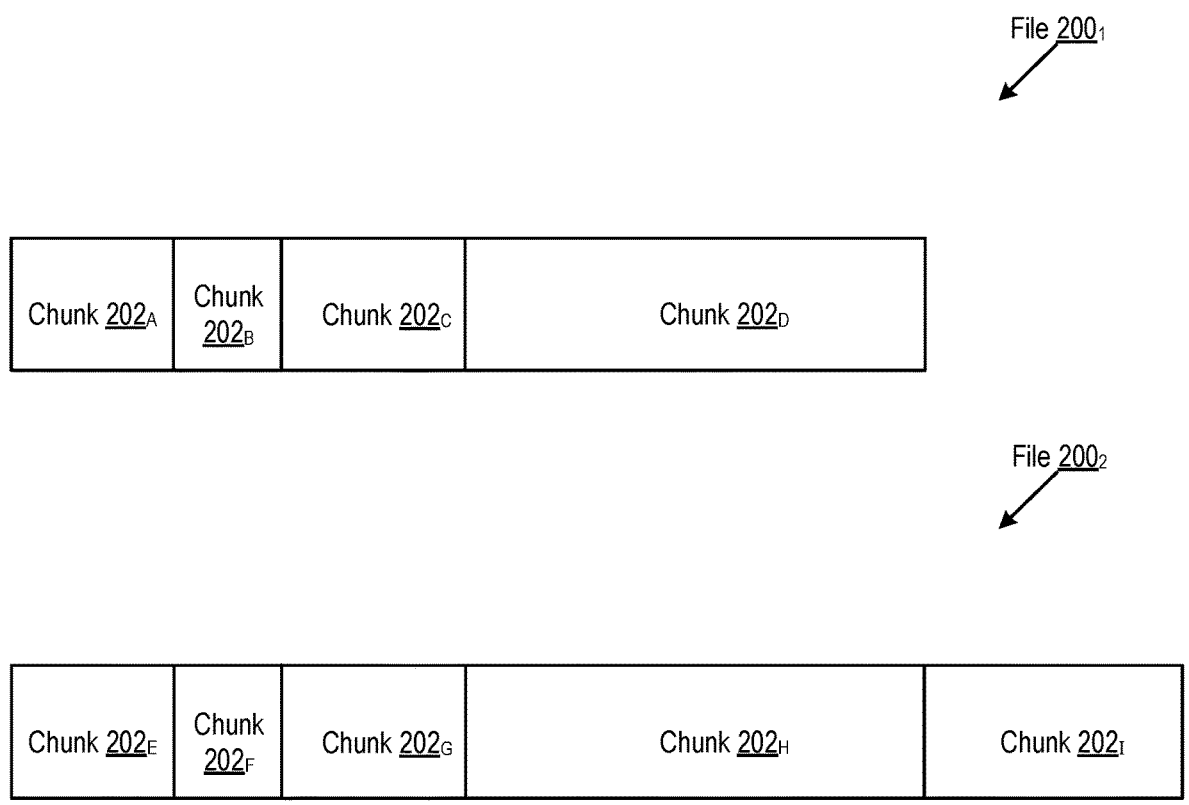
FIG. 2 depicts a block diagram of two exemplary files, according to an embodiment.

FIG. 2 depicts a block diagram of two exemplary files 200, according to an embodiment. Storage devices 114 of chunk store 134 store files 200. Each file 200 is divided into portions or chunks 202. In an embodiment, deduplication performed herein is byte-level deduplication. With byte-level deduplication, file 200 may be divided into chunks 202 by the following exemplary process. Deduplication module 144 chooses a small window size and computes a hash for a byte window starting at every byte offset of file 200. This can be done efficiently using Rabin fingerprints. If the hash matches a fixed value (e.g., zero), deduplication module 144 considers that file offset to be a boundary. Such a boundary is called a content-based boundary. A chunk 202 may be defined to be the file data between two boundaries. A boundary may also be the start and end of file 200.

Deduplication module 144 then computes a second hash for each chunk 202, and this is the hash that is checked against and inserted into chunk store data structures 140 and 142, as further described below. The second hash may be computed by, for example, a hash algorithm such as secure hash algorithm (SHA)-256 or SHA-512. In an embodiment, the computed hash may be truncated, and the truncated hash is the second hash that is associated with a chunk 202, as further described with reference to FIG. 3, below.

A benefit of such a method of dividing a file 200 into chunks 202 is that, if data in file 200 shifted (e.g., a new line is inserted at the beginning of file 200), most chunks 202 in file 200 are not affected. Such boundary setting may result in the detection of more duplicated content and may achieve increased storage space saving via deduplication. The average size of chunk 202 may be, for example, approximately 80 KB. Chunks 202 may be of different sizes.

Returning to FIG. 1A, chunk store 134 also comprises two data structures: chunk hash table 140 and chunk ID table 142. Although chunk hash table 140 and chunk ID table 142 are described as "tables," these two data structures may be any data structure that can perform the functions of chunk hash table 140 and chunk ID table 142. Chunk hash table 140 and chunk ID table 142 may not be the same data structure. For example, the two data structures may be an log structured merge (LSM) tree, a $B^F$ tree, or a B+ tree.

Figure 1C:
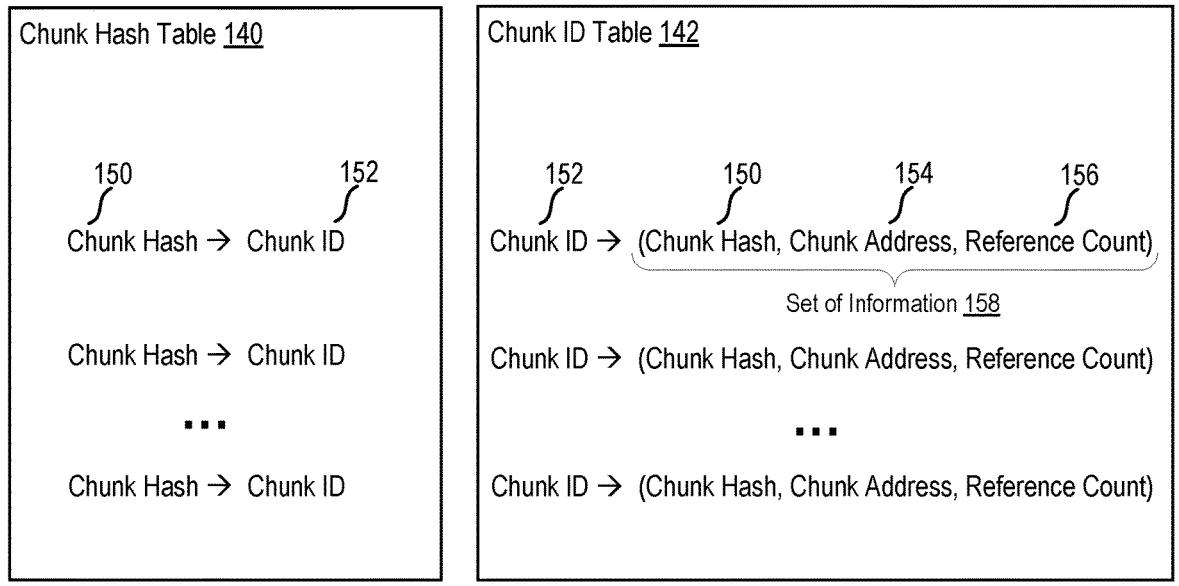
FIG. 1C depicts a block diagram of an exemplary chunk hash table and an exemplary chunk ID table, according to an embodiment.

Chunk hash table 140 is shown in detail in FIG. 1C. Chunk hash table 140 is a key-value data structure that, when given a key, returns a value that is mapped to that key. The key-value mappings are mappings from the key to the value. Chunk hash table 140 includes key-value mappings, each mapping being between (a) the key, which is the hash of the contents of chunk 202 (i.e., chunk hash 150), and (b) the value, which is a chunk identifier (ID) 152. Chunk ID 152 is an arbitrarily assigned alphanumeric identifier that preserves locality and sequential order of chunks 202 of file 200. For example, chunk $202_A$ of file $200_1$ may be assigned the arbitrary chunk ID of "650." Chunk $202_B$ may then be assigned the next sequential, contiguous chunk ID, such as "651." Chunk $202_C$ may be assigned a chunk ID of "652," etc. It should be noted that "contiguous" may be defined in arbitrary increments within system 100. For example, contiguity may be defined in increments of 0.5 or 10. If contiguity is defined in increments of 0.5, then after chunk ID "650," the next contiguous chunk ID is "650.5." If contiguity is defined in increments of 10, then after chunk ID "650," the next contiguous chunk ID is "660." As discussed below with reference to FIG. 6, chunk IDs 152 may be sourced from a reserved batch of contiguous chunk IDs 152, the batch having been reserved for a specific deduplication module 144, for deduplication at a specific logical deduplication checkpoint. The reserved batch may be assigned to prevent the same chunk ID 152 from being assigned to different chunk hashes 150 within chunk hash table 140. A "checkpoint" may be a time provided by a logical clock, as discussed in U.S. application Ser. No. 16/552,965, incorporated by reference above.

In an embodiment, chunk hash table 140 may be implemented such that once a key-value entry has been created, another key-value entry with the same key cannot be added to chunk hash table 140. Chunk hash table 140 may be implemented such that once a key-value entry has been created, that key-value entry can be deleted, but cannot be modified. Chunk hash table 140 may be implemented such that if an attempt to add an entry with a key (hash 150) that is already within chunk hash table 140, then an error is returned to the process or component that is attempt to add the entry with an existing key (hash 150).

Preventing duplication of keys and/or modifications in chunk hash table 140 prevents, for example, the following scenario. Assume two deduplication modules 144 are deduplicating two copies of an identical file 200. The first deduplication module 144 might add an entry that maps a chunk hash 150 to a chunk ID 152. The second deduplication module 144 might then process a chunk 202 with identical content, and attempt to add an entry that maps an identical chunk hash 150 to a new chunk ID 152. The new entry might replace the previous entry, which may cause irregularities within system 100, such as loss of a value with the previous chunk ID 152. Or the new entry might be added in addition to the previous entry, which would cause the same chunk hash 150 to map to two different chunk IDs 152, and which would upset the integrity of system 100.

In such an embodiment, chunk hash table 140 may be implemented as a file directory within a file system (not shown) of system 100, that file system supporting the Portable Operating System Interface (POSIX) standard and semantics. The file system may be, for example, Virtual Distributed File System (VDFS) made commercially available by VMware, Inc. of Palo Alto, Calif.

When chunk hash table 140 is implemented as a file directory, each key (hash 150) of chunk hash table 140 is a separate file, and the contents of that file may be the chunk ID 152. When creating each file of chunk hash table 140, the standard "O_CREAT|O_EXCL" option defined in POSIX open call may be set so as to indicate that (a) the file is to be created if that file does not yet exist (e.g., a file with the same name does not exist), or (b) an error is returned if the file already exists (e.g., a file with the same name already exists within chunk hash table 140). Setting the above flag causes the file system to report an error if the file to be created already exists. In an embodiment, chunk hash table 140 may be implemented such as once a file has been created, an attempt to modify the file results in the file system returning an error.

An "exclusive" flag within each file of the file directory may be set indicating that the file is an "exclusive" file. Setting the exclusive flag causes the directory to behave such that once a file has been created, that file entry can be deleted, but if an attempt to modify the file is made, an error is returned. Setting the exclusive flag causes the directory to additionally behave such that once a file has been created, an attempt to add a file with the same name results in an error.

In an embodiment, chunk hash table 140 is distributed among virtual nodes 160. Chunk hash table 140 may be divided into separate portions, with each portion being associated with a virtual node 160, and with each portion being stored on host 105 on which the associated virtual node 160 is located. For example, chunk hash table 140 may be divided into separate portions, with each portion comprising entries (key-value entries) of chunk hash table 140 according to the first two bits (e.g., or N number of bits) of the binary representation of the chunk hash 150 of the key-value entry. Table 1 shows an exemplary distribution of key-value entries among virtual nodes 160. The first column of Table 1 shows that all entries of chunk hash table 140 that have a chunk hash 150 starting with a binary "00" are stored on host 105 on which virtual node "0" is located.

TABLE 1

|  | Node 0 | Node 1 | Node 2 | Node 3 |
| --- | --- | --- | --- | --- |
| Chunk Hash | 00* | 01* | 10* | 11* |

In order to determine which host 105 is hosting a given virtual node 160, and therefore to determine which host 105 contains a certain entry of chunk hash table 140, a component of system 100 may reference node-to-host mapping table 148.

Chunk ID table 142 is shown in detail in FIG. 1C. Chunk ID table 142 is a key-value data structure that, when given a key, returns a value that is mapped to that key. The key-value mappings are mappings from the key to the value. Chunk ID table 142 includes key-value mappings, each mapping being between (a) the key, which is chunk ID 152 (e.g., obtained from chunk hash table 140), and (b) the value, which is a set of information 158 about chunk 202 corresponding to that chunk ID 152. Set of information 158 may be considered "metadata" about chunk 202 corresponding to chunk ID 152 mapped to the set of information 158. Set of information 158 may include: chunk hash 150, a pointer 154 to the contents of chunk 202 within chunk store 134, and a reference count 156 of chunk 202. Pointer 154 to the contents of chunk 202 may include an address, such as a logical or physical address. Pointer 154 may be a plurality of pointers 154 pointing to locations of file 200 within storage(s) 114. Pointer 154 may be a plurality of pointers if, for example, file 200 is a fragmented file, stored in more than one location within storage(s) 114. In an embodiment, pointer 154 is a logical pointer 154. Reference count 156 of chunk 202 may be the number of pointers (e.g., pointers 154 and pointers of files 200) that point to the contents of chunk 202. In an embodiment, reference counts 156 may be stored in a separate data structure and created, modified, and generally managed as described in U.S. application Ser. No. 16/552,954, incorporated by reference above. Tables 140 and 142 may be regarded as containing "metadata" of the content or data of chunks 202.

In an embodiment, chunk ID table 142 is distributed among virtual nodes 160. Chunk ID table 142 may be divided into separate portions, with each portion being associated with a virtual node 160, and with each portion being stored on host 105 on which the associated virtual node 160 is located. For example, chunk ID table 142 may be divided into separate portions, with each portion comprising entries (key-value entries) of chunk ID table 142 in a way that preserves locality of chunks 202 within deduped files 200, and preserves sequential and contiguous organization of entries within chunk ID table 142. "Locality" of chunks 202 is determined by order and proximity of chunks 202 within files 200. Order of metadata (e.g., data within tables 140 and/or 142) of chunks 202 is based on locality or order of chunks 202 within files 200. Organizing metadata by order of chunks 202 preserves locality of chunks 202 of deduped files 200.

As used herein, the terms "deduped" and "deduplicated" are synonymous, and mean "having gone through a process of deduplication." Entries within chunk ID table 142 are organized by chunk ID 152. Table 2 shows an exemplary distribution of key-value entries among virtual nodes 160. The first column of Table 2 shows that all entries of chunk ID table 142 of value 1-1000 are stored on host 105 on which virtual node "0" is located.

TABLE 2

|  | Node 0 | Node 1 | Node 2 |
|---|---|---|---|
| Chunk ID | 1-1000 | 1001-2000 | 2001-3000 |

In order to determine which host 105 is hosting a given virtual node 160, and therefore to determine which host 105 contains a certain entry of chunk ID table 142, a component of system 100 may reference node-to-host mapping table 148.

Figure 3:
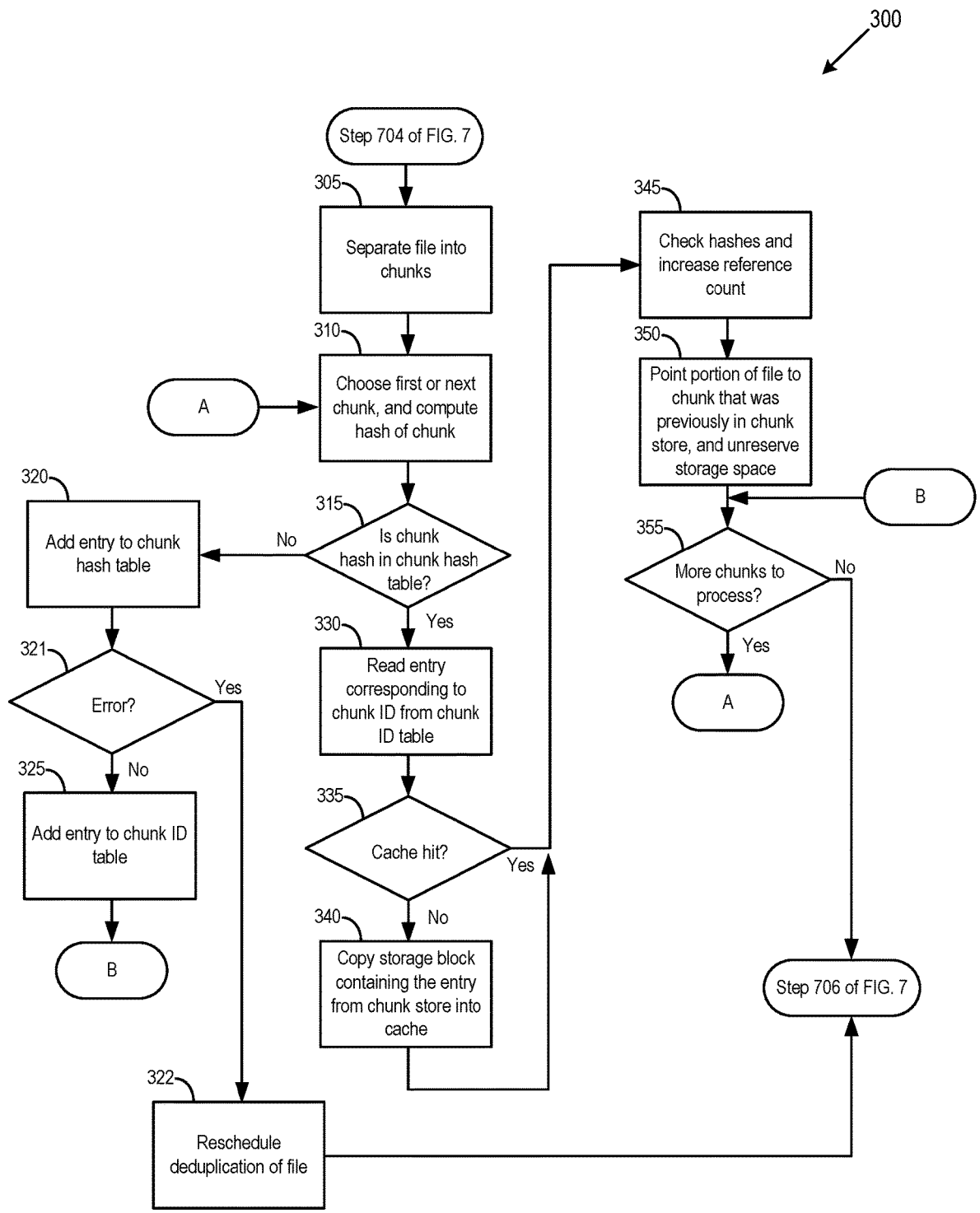
FIG. 3 depicts a flow diagram of a method of deduplicating a file, according to an embodiment.

FIG. 3 depicts a flow diagram of a method 300 of deduplicating a file 200, according to an embodiment. Method 300 may be performed by deduplication module 144. Method 300 may be performed in the background, asynchronously relative to I/O operations directed to chunk store 134. Method 300 may be reached from step 702 of method 700, described below.

At step 305, deduplication module 144 creates boundaries within file 200 so as to divide file 200 into chunks 202. Step 305 may be performed by a process that includes Rabin fingerprinting, as described above with reference to FIG. 2. Deduplication module 144 further assigns chunk IDs to the chunks 202, such as from a batch of reserved contiguous chunk IDs 152 which may be obtained according to method 600 described with respect to FIG. 6. The chunks 202 may be assigned chunk IDs contiguously with respect to their position in file 200.

At step 310, deduplication module 144 chooses a first or next chunk 202 for processing in subsequent steps of method 300. If step 310 is reached from step 305, then method 300 has just began its first iteration, and so deduplication module 144 chooses the first chunk 202 of file 200. If step 310 is reached from step 355, then method 300 is restarting a new iteration, and so deduplication module 144 chooses the next chunk 202 of file 200.

As part of step 310, deduplication module 144 computes a hash of the data of chosen chunk 202. The hash may be computed by, for example, SHA-256 or SHA-512. In an embodiment, the computed hash may be truncated (e.g., a SHA-512 hash may be truncated to 256 bits), and the truncated hash is the hash that is "computed at step 310" for subsequent steps of method 300.

At step 315, deduplication module 144 determines whether the hash of chunk 202, computed at step 310, is in chunk hash table 140. If so, then the identical contents of chunk 202 have been previously processed by deduplication module 144, such as for example as part of a previous execution of method 300. Also if so, then a chunk identical to chunk 202 is already present within chunk store 134. If identical contents of chunk 202 have been previously processed, then an entry for hash 150 and chunk ID 152 for contents of chunk 202 already exist within chunk hash table 140, the entry having been added by a previous execution of method 300. If the hash of chunk 202 is in chunk hash table 140, then method 300 continues to step 330. Optionally, if the hash of chunk 202 is in chunk hash table 140, then as part of step 315, deduplication module 144 extracts chunk ID 152 from chunk hash table 140. In determining whether the hash of chunk 202 is in chunk hash table 140, deduplication module may access portions of chunk hash table 140 located at other hosts 105 by referencing node-to-host mapping table 148.

If the hash of chunk 202 is not in chunk hash table 140, then the contents of chunk 202 have not been previously deduplicated through the processing of method 300, and method 300 proceeds to step 320.

At step 320, deduplication module 144 attempts to add an entry for chunk 202 to chunk hash table 140. As discussed above, an entry in chunk hash table 140 includes a key-value mapping between (a) the key, which is the hash of the contents of chunk 202 (i.e., chunk hash 150), and (b) the value, which is a chunk ID 152. Chunk hash 150 was computed at step 310. Chunk ID 152 is assigned to chunk 202 as described above with reference to FIG. 2. If chunk 202 chosen at step 310 is the first chunk 202 of a file (e.g., chunk $202_A$ of file $200_1$), then chunk ID 152 may be assigned arbitrarily. If chunk 202 chosen at step 310 is a second or subsequent chunk 202 (e.g., chunk $202_B$ of file $200_1$), then chunk ID may be the next sequential identifier after chunk ID 152 assigned to the previous chunk 202. Previous chunk 202 may be, for example, chunk $202_A$ of file $200_1$.

At step 321, deduplication module 144 determines whether an error has been returned in response to attempted step 320. If an error has been returned, then step 320 did not occur. If the chunk hash 150 of the chunk 202 attempting to be added to chunk hash table 140 does not exist in chunk hash table 140, an error does not occur. An error occurs when the chunk hash 150 of the chunk 202 attempting to be added to chunk hash table 140 already exists in chunk hash table 140. For example, a second deduplication module 144 may be processing, in parallel, a chunk 202 with the same content as the present deduplication module 144 of method 300. For example, the two deduplication modules 144 may be processing two identical copies of a file 200. If an error has been returned, then method 300 continues to step 322. Otherwise, the attempt of step 320 was successful and method 300 continues to step 325.

At step 322, deduplication module 144 reschedules the deduplication of file 200 until a later time. The rescheduling may be performed by placing file 200 at the end of queue 164. The rescheduling is done in order to avoid conflict that arises while deduplicating a series of chunks 202 identical to a series of chunks 202 being deduplicated by another deduplication module 144. When deduplication module 144 returns to the rescheduled file 200 and performs method 300 again on that file, an entry for chunks 202 of that file 200 is likely to already exist within chunk hash table 140 and chunk ID table 142 (e.g., step 315 proceeds to step 330 instead of step 320), and conflict in adding entries to tables 140, 142 is not likely to arise while deduplicating file 200. After step 322, method 300 continues to step 706 of method 700.

At step 325, deduplication module 144 adds an entry for chunk 202 to chunk ID table 142. As described above, an entry in chunk ID table 142 includes a key-value mapping between (a) the key, which is the chunk ID 152 assigned at step 320, and (b) the value, which is a set of information 158 about chunk 202 corresponding to that chunk ID 152. As part of step 325, reference count 156 is modified to indicate that a reference to chunk 202 exists in chunk ID table 142 and in file 200 being deduped. In an embodiment, the reference count is set to or incremented by one. As part of step 325, the storage block to which an entry for chunk 202 is added is copied or fetched from one of storages 114 into cache 132. This copying of the storage block into memory 110 may be an automatic part of caching and swapping operations performed by hypervisor 116, an operating system of host 105, and/or a guest operating system of VM 120. After step 325, method 300 continues to step 355.

At step 330, deduplication module 144 uses chunk ID 152 extracted from chunk hash table 140 at step 315 to send a request to obtain set of information 158 about chunk 202. The set of information 158 is requested from chunk ID table 142. Deduplication module 144 uses chunk ID 152 as a key into chunk ID table 142. The value returned (at step 330 or a subsequent step) is the set of information 158 about chunk 202. Deduplication module 144 first checks whether the set of information 158 is in cache 132 before checking storage 114 of chunk store 134. In requesting set of information 158, deduplication module may access portions of chunk ID table 142 located at other hosts 105 by referencing node-to-host mapping table 148.

At step 335, deduplication module 144 determines whether the set of information 158 is in cache 132. If so, then method 300 skips step 340 and continues to step 345. If not, then method 300 continues to step 340.

At step 340, the storage block on which the set of information 158 is stored is copied or fetched from one of storages 114 into cache 132. As part of step 340, deduplication module 144 obtains from block cache 132 the set of information 158 associated with chunk 202. This copying of the storage block into memory 110 may be an automatic part of caching and swapping operations performed by hypervisor 116, an operating system of host 105, and/or a guest operating system of VM 120.

In an embodiment, when the storage block containing the set of information corresponding to a given chunk ID is copied from storage 114 to cache 132, the contents of the chunks 202 (that correspond to chunk IDs 152 in the storage block) are not copied into cache 132.

It should be noted that the entries in chunk ID table 142 are arranged or organized by sequential and contiguous chunk IDs 152. The entries of chunk ID table 142 may be stored sequentially and contiguously in storage 114. This means that a storage block containing the set of information 158 corresponding to a given chunk ID 152 is likely to also store the sets of information 158 corresponding to a plurality of chunk IDs 152 that are before and/or after the given chunk ID 152. The sets of information 158 within the storage block may be arranged contiguously with one another (in an embodiment, unseparated by other data), in an order that matches the order of associated chunk IDs 152. For example, if a storage block stores the set of information corresponding to chunk ID 152 of chunk $202_B$ of file $200_1$, then that same storage block is likely to also store the set of information corresponding to the chunk IDs 152 of chunks $202_A$, $202_C$, and $202_D$.

The advantage of preserving locality by organizing sets of information 158, within chunk ID table 142, by sequential and contiguous chunk IDs 152, is illustrated with respect to the following example. Assume file $200_1$ has already been deduped and file $200_2$ is in the process of being deduped by method 300. Assume that at step 315, the hash of chunk $202_E$ of file $200_2$ is determined to already be within chunk hash table 140, meaning that a chunk identical to $202_E$ is already in chunk store 134. Assume that this previously deduped and identical chunk 202 is chunk $202_A$ of file $200_1$. It is likely that after chunk $202_A$, the subsequent several chunks $202_B$, $202_C$, $202_D$, etc. of file $200_1$ are the same as the several chunks following chunk $202_E$ of file $200_2$. The sets of information 158 corresponding to chunks $202_B$, $202_C$, and $202_D$ are likely within the same storage block as the set of information 158 of chunk $202_A$. When the storage block containing set of information 158 of chunk $202_A$ is copied into cache 132 of memory 110, the sets of information 158 corresponding to chunks $202_B$, $202_C$, and $202_D$ are also likely copied into cache 132. When, for example, $202_F$ of file $200_2$ is processed by method 300, the hash of the contents of chunk $202_F$ is likely to be the same as the hash of chunk $202_B$. The hash of chunk $202_B$ is already in chunk hash table 140 and chunk ID table 142 as chunk hash 150.

When the hash of chunk $202_F$ is calculated, set of information 158 corresponding to that hash is likely to already be in cache 132, precluding a need to copy a new storage block into cache 132 as part of an I/O operation, as illustrated by the skipping of step 340 if a cache hit occurs in step 335 of method 300. This speeds up processing and deduplication of files 200. Organizing the sets of information, within chunk ID table 142, by sequential and contiguous chunk IDs 152, preserves locality of deduped files 200. The preserved locality results in faster read operations of sets of information 158, because the read operations are executed from memory 110 rather than from storage 114.

At step 345, deduplication module 144 checks that the hash calculated at step 310 is the same as chunk hash 150 within the obtained set of information 158. If not, then method 300 may abort and an administrator may be notified. If the hashes match, then deduplication module 144 performs a write to the storage block copied into cache at step 340. The write increases reference count 156, within the set of information 158, by one. The increase by one indicates that the portion of file 200 corresponding to chunk 202 chosen at step 310 is now pointing to the chunk 202 that had already been in chunk store 134 (and whose set of information 158 was obtained at previous steps).

At step 350, a deduplication module 144 or a garbage collection module (not shown) unreserves storage space within storage 114. The unreserved storage space corresponds to the space where chunk 202 chosen at step 310 is stored. The freeing or unreserving of storage blocks may be performed as described by U.S. application Ser. No. 16/552,954, incorporated by reference above. As part of step 350, the portion of file 200 that previously pointed to chunk 202 chosen at step 310 is remapped to point at shared chunk 202 that had already been in chunk store 134, and whose set of information 158 was retrieved at steps 330-340. As used herein, a "shared chunk" 202 is a chunk that is referenced by more than one file 200.

As part of step 350, memory pages corresponding to shared chunk 202, whose set of information 158 was retrieved at steps 330-340, are marked as copy-on-write (COW). Marking pages as COW may be performed by hypervisor 116 or an operating system of host 105 or VM 120. Step 350 may be performed before, concurrently, or after step 345.

At step 355, deduplication module 144 determines whether more chunks 202 of file 200 (of step 305) need to be processed by method 300. If so, method 300 returns to step 310. Otherwise, method 300 continues to step 706 of method 700.

Figure 4:
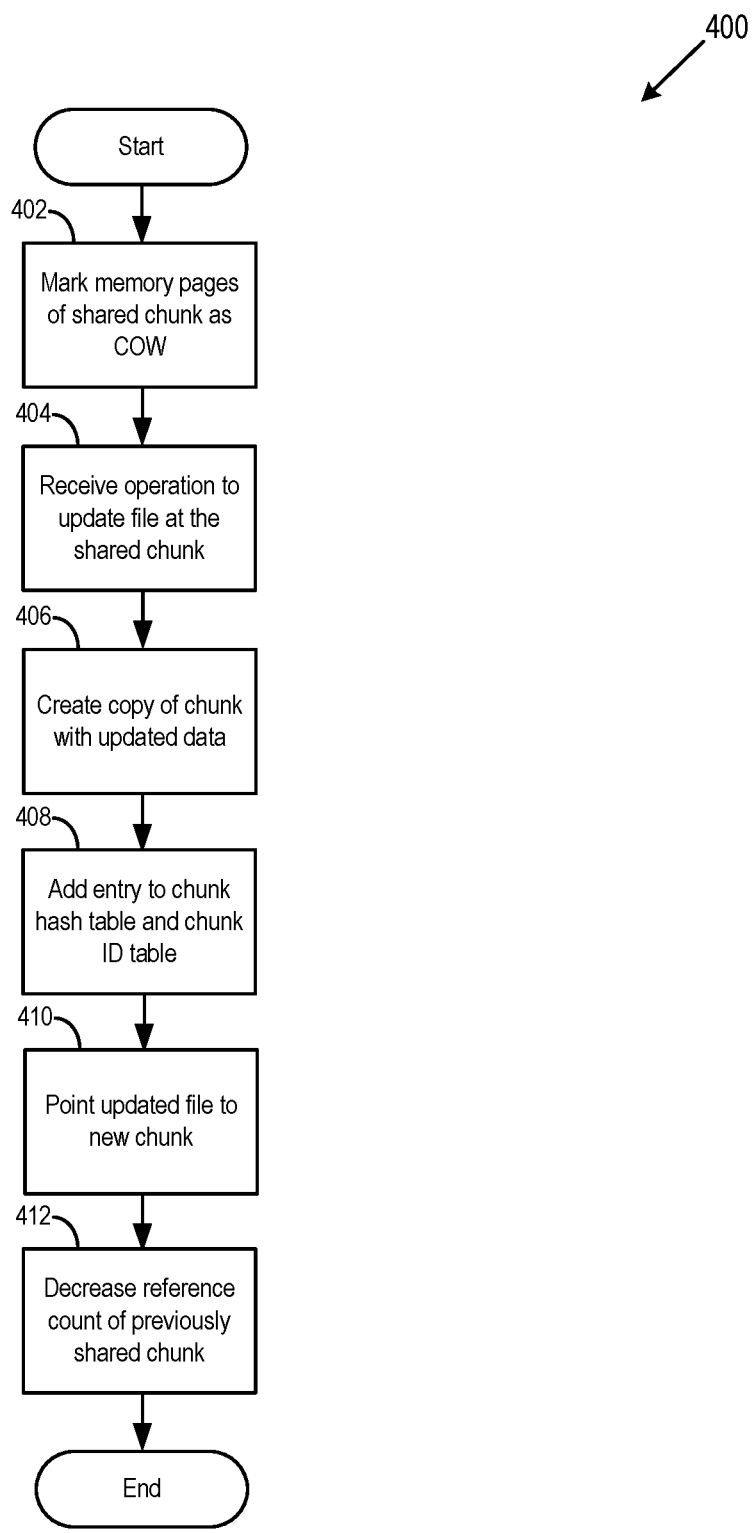
FIG. 4 depicts a flow diagram of a method of updating a file that has been previously duped, according to an embodiment.

FIG. 4 depicts a flow diagram of a method 400 of updating a file 200 that has been previously deduped, according to an embodiment. Method 400 may be performed by deduplication module 144, hypervisor 116, an operating system of host 105 or VM 120, or a combination of these components. The file 200 that has been previously deduped may have been deduped by method 300.

At step 402, deduplication module 144 (or hypervisor 116 or an operating system of host 105 or VM 120) marks memory pages of a shared chunk 202 as COW. Step 402 may be performed as part of method 300, such as part of step 350 of method 300.

At step 404, chunk store 134 or hypervisor 116 receives an operation to update a file 200 that references the shared chunk 202, and the update operation is directed at contents of shared chunk 202.

At step 406, chunk store 134 or hypervisor 116 creates a copy of shared chunk 202, the copy being a new chunk 202 with updated data, as per the update operation of step 404.

At step 408, an entry for new chunk 202 is added to chunk hash table 140, similarly to the process of step 320 of method 300. Also as part of step 408, an entry for new chunk 202 is added to chunk ID table 142, similarly to the process of step 325 of method 300.

At step 410, the portion of updated file 200 that previously pointed to shared chunk 202 is remapped to point to new chunk 202. Because file 200 is remapped to a new chunk, shared chunk 200 may no longer be a "shared chunk" at step 410. As part of step 410 or as part of another step of method 400, the memory pages of previously shared chunk 202 may be unmarked COW.

At step 412, deduplication module 144 decreases the reference count of the shared chunk or previously shared chunk 202 by one. After step 412, method 400 ends.

Figure 5:
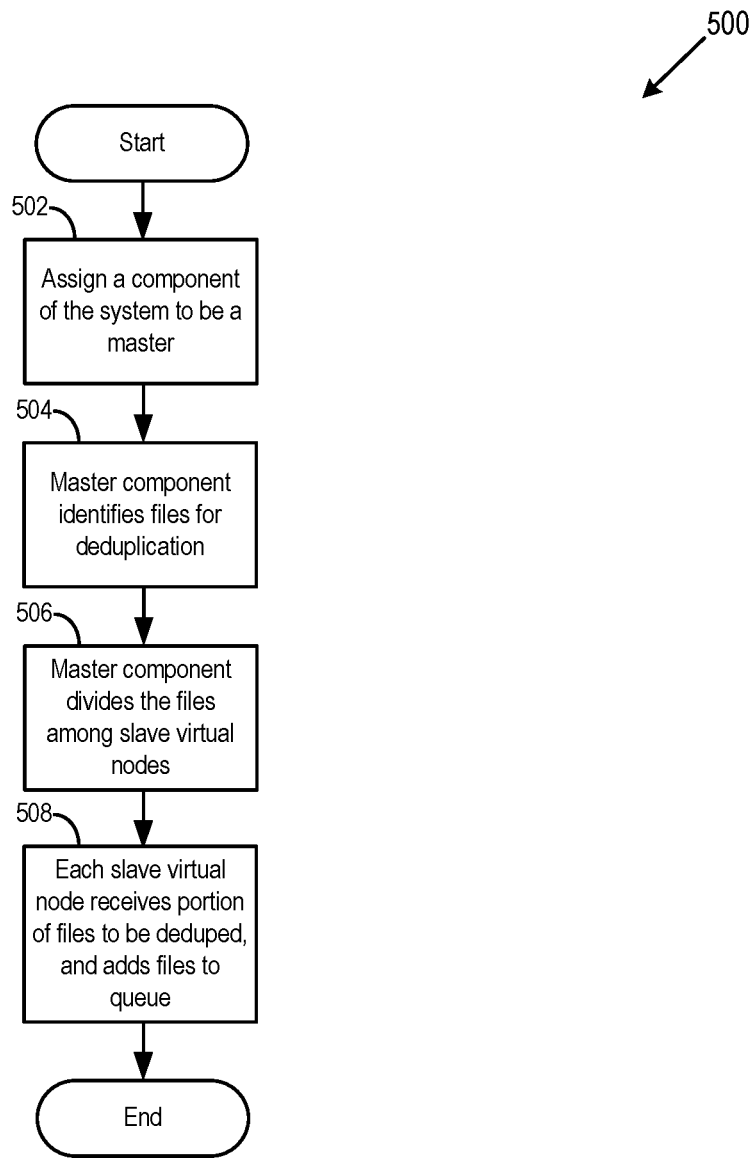
FIG. 5 depicts a flow diagram of a method of distributing files to a plurality of virtual nodes for deduplication, according to an embodiment.

FIG. 5 depicts a flow diagram of a method 500 of distributing files 200 to a plurality of virtual nodes 160 for deduplication, according to an embodiment. Method 500 may be done asynchronously with methods 300 and/or 700.

At step 502, a component of system 100 is assigned to be a master component 162 for the purpose of coordinating deduplication among a plurality of deduplication modules 144 and associated virtual nodes 160. Master component 162 may be one of virtual nodes 160, or may be another component of system 100. Master component 162 may be chosen algorithmically, or may be chosen manually such as by an administrator.

At step 504, master component 162 identifies files 200 of chunk store 134 for deduplication. Master component may identify files 200 for deduplication by identifying new files 200 that have not yet been deduped, and by identifying files 200 that have been updated since a last time checkpoint at which deduplication was performed. Identified updated files 200 may be files 200 that have been updated recently but have not been updated for a threshold length of time. The threshold length of time may be, for example, 24 hours. "Recently" may mean a time range that is between (a) the time that the file was last updated, and (b) the current time. Files 200 may be identified for deduplication as described in U.S. application Ser. No. 16/552,965, incorporated by reference above.

At step 506, master component 162 divides files 200 identified at step 504 among slave virtual nodes 160. As used herein, the term "slave" denotes that the virtual node is subordinate to the master component 162, and that the master component 162 coordinates the deduplication among the slave virtual nodes 160. Files 200 may be divided among some or all slave virtual nodes 160.

At step 508, each slave virtual node 160 receives a set of files 200 that is to be deduped by a deduplication module 144 associated with the slave virtual node 160. As part of step 508, the received set of files 200 may be placed within queue 164 of associated deduplication module 144. Deduplication of such files 200 in queue 164 may be performed according to method 700 described with respect to FIG. 7. After step 508, method 500 ends or returns to step 504 to identify files 200 that are newly ready for deduplication.

Figure 6:
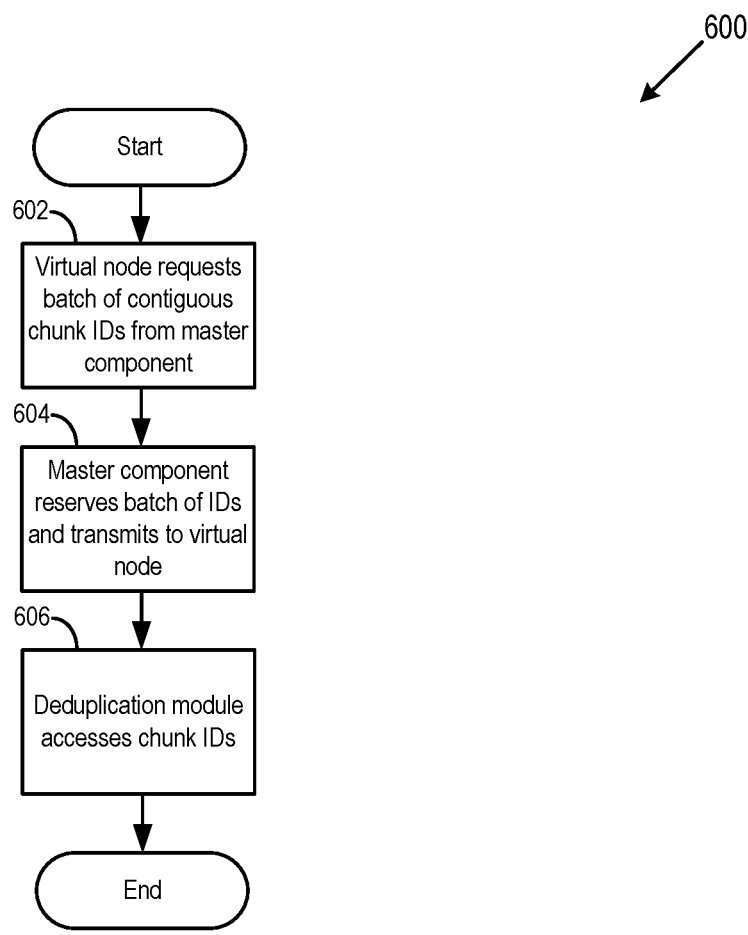
FIG. 6 depicts a flow diagram of a method of obtaining a batch of reserved and contiguous chunk IDs for the deduplication of files, according to an embodiment.

FIG. 6 depicts a flow diagram of a method 600 of obtaining a batch of reserved and contiguous chunk IDs 152 for the deduplication of files 200, according to an embodiment. It should be noted that method 600 may be performed at any suitable time. For example method 600 may be performed prior to a slave virtual node 160 receiving any files 200, thereby reserving chunk IDs 152 to assign to files 200 (e.g., such as performed at step 305 of method 300) when such files 200 are received (e.g., such as performed at step 508 of method 500). In another example, method 600 may be performed after a slave virtual node 160 receives files 200 for deduplication (e.g., such as performed at step 508 of method 500). In yet another example, deduplication module 144, while attempting to assign a chunk ID to a chunk (e.g., such as performed at step 305 of method 300), may not have any remaining reserved chunk IDs 152 and accordingly method 600 may be performed to obtain a new batch of reserved and contiguous chunk IDs 152. Though this may cause a break in continuity between chunk IDs of two adjacent chunks for between which a new batch is obtained, other chunks still have continuity of chunk IDs.

At step 602, a slave virtual node 160 requests a batch of contiguous chunk IDs 152 from master component 162.

At step 604, master component 162 reserves a batch of contiguous chunk IDs 152 and transmits the reserved chunk IDs 152 to slave virtual node 160. The reserved batch of chunk IDs 152 is unique in system 100, and master component 162 may not assign for parallel deduplication two or more ranges that share chunks IDs 152. Each reserved batch of chunk IDs 152, for parallel deduplication, has or consists of unique chunk IDs 152, in relation to other reserved batches of chunk IDs for parallel deduplication. As a result, none of the other virtual nodes 160 may assign (to an associated deduplication module 144) chunk IDs 152 within the range of chunk IDs 152 reserved for the slave virtual node 160. As part of step 604, master component 162 transmits the reserved batch of contiguous chunk IDs 152 to slave virtual node 160.

At step 606, deduplication module 144 associated with the slave virtual node 160 accesses the batch of chunk IDs 152 received at step 604. The access allows deduplication module 144 to deduplicate chunks 202 identified by the batch of chunk IDs 152.

Figure 7:
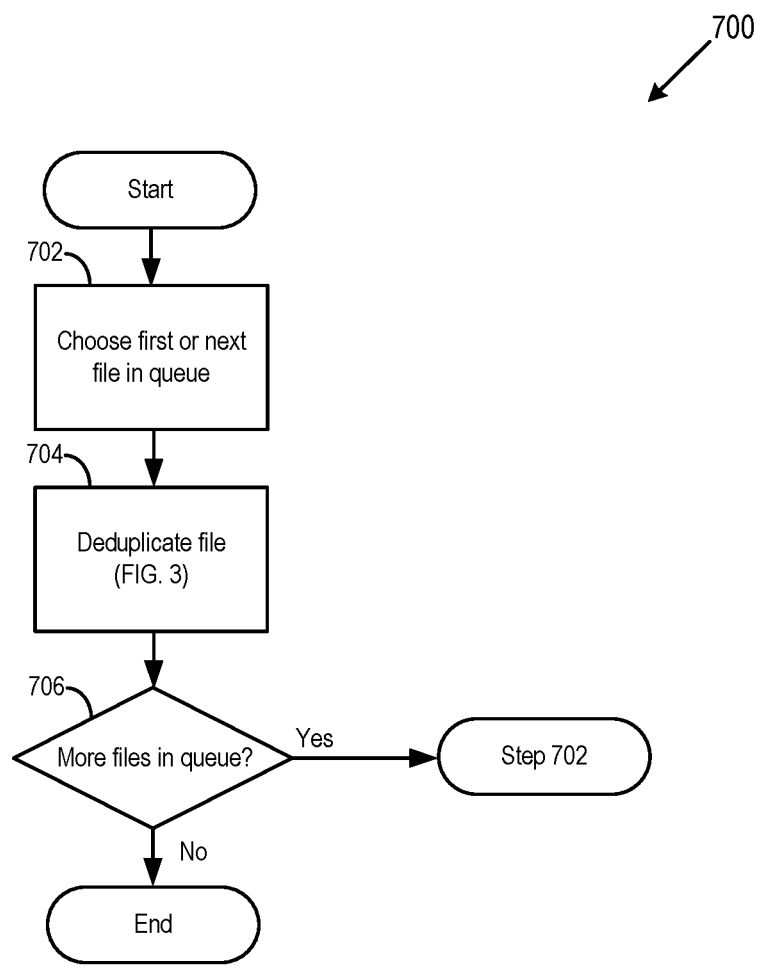
FIG. 7 is a flow diagram of a method of deduplicating a plurality of files by a deduplication module, according to an embodiment.

FIG. 7 is a flow diagram of a method 700 of deduplicating a plurality of files 200 by a deduplication module 144, according to an embodiment. It should be noted that although the deduplication is described as being performed by deduplication module 144, the deduplication may be regarded as being performed by virtual node 160 associated with the deduplication module 144, and/or may be regarded as being performed by host 105 on which the deduplication module 144 executes.

At step 702, deduplication module 144 chooses a first or next file 200 within its queue 164 for deduplication. If step 702 is reached from step 706, then deduplication module 144 may choose the next file 200 in queue 164. Otherwise, deduplication module 144 may choose the first file 200 in queue 164.

At step 704, deduplication module deduplicates the files 200 chosen at step 702. The deduplication may be performed as per method 300 of FIG. 3.

At step 706, deduplication module 144 determines whether more files 200 are in its queue 164. If so, then method 700 returns to step 702. If no more files remain to be deduplicated in queue 164, then method 700 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of deduplicating a plurality of files using a plurality of slave nodes, the method comprising:

receiving, at a first slave node of the plurality of slave nodes, a first portion of the plurality of files, wherein each slave node of the plurality of slave nodes is assigned a different portion of the plurality of files;

placing the first portion of the plurality of files in a queue stored at the first slave node; and deduplicating, by the first slave node, the first portion of the plurality of files on a file by file basis in order of the queue, comprising:

retrieving a first file of the first portion of the plurality of files in the queue;

determining that a hash of a content of a chunk of the first file does not exist in a chunk hash data structure, the chunk hash data structure comprising a first plurality of key-value mappings between a first plurality of keys and a first plurality of values, the first plurality of keys each being a hash of a content of a corresponding chunk;

based on determining the hash does not exist in the chunk hash data structure, attempting to add an entry into the chunk hash data structure, the entry comprising the hash of the content of the chunk of the first file;

during the attempting, if the hash of the content of the chunk of the first file still does not exist in the chunk hash data structure:

adding the entry into the chunk hash data structure; and proceeding with deduplication of the first file; and during the attempting, if the hash of the content of the chunk of the first file does exist in the chunk hash data structure:

refraining from adding the entry into the chunk hash data structure to prevent duplicate entries in the chunk hash data structure;

stopping deduplication of the first file; and moving the first file to a later position in the queue.

2. The method of claim 1, wherein a master component that coordinates deduplication of the plurality of files among the plurality of slave nodes assigns the different portions of the plurality of files to the plurality of slave nodes.

3. The method of claim 1, wherein deduplicating the first portion of the plurality of files further comprises:

based on determining that a first hash of a first chunk of the first file exists in the chunk hash data structure, wherein the first plurality of values each are a chunk ID of the corresponding chunk:

determining a chunk ID of a second chunk by mapping the first hash to the chunk ID of the second chunk using the chunk hash data structure;

determining a first set of information of the second chunk by mapping the chunk ID of the second chunk to the first set of information using a chunk ID data structure, the first set of information including a pointer to content of the second chunk, the chunk ID data structure comprising a second plurality of key-value mappings between a second plurality of keys and a second plurality of values, the second plurality of keys being the chunk IDs of the chunk hash data structure, and the second plurality of values being sets of information about the corresponding chunk, and wherein ordering of chunk IDs within the chunk ID data structure serves to preserve locality of the sets of information with respect to the chunks that correspond to the chunk IDs; and modifying a pointer in the first file corresponding to the first chunk to point to the content of the second chunk.

4. The method of claim 3, wherein a master component that coordinates deduplication of the plurality of files among the plurality of slave nodes assigns the different portions of the plurality of files to the plurality of slave nodes, and further comprising:

receiving, from the master component, a range of contiguous chunk IDs, wherein the master component assigns different ranges of contiguous chunk IDs to different slave nodes, each of the different ranges comprising its own unique set of identifiers to preserve location of the sets of information with respect to the corresponding chunks and ensure a given chunk ID is not used by multiple slave nodes; and assigning the range of contiguous chunk IDs to chunks of the first portion of the plurality of files contiguously.

5. The method of claim 1, wherein the later position in the queue comprises an end of the queue.

6. The method of claim 1, wherein the chunk hash data structure is divided into several portions, and wherein each of the portions of the chunk hash data structure is associated with a different slave node.

7. The method of claim 1, wherein the chunk hash data structure comprises a file directory, wherein each of the first plurality of keys comprises a file in the file directory having a filename corresponding to a hash of a content of a chunk of the file, wherein attempting to add the entry into the chunk hash data structure comprises attempting to add a corresponding file into the chunk hash data structure with a filename corresponding to the hash of the corresponding chunk, wherein the file directory returns an error when an attempt to add an existing filename to the file directory is made, and wherein an error indicates the hash of the content of the chunk of the corresponding file does exist in the chunk hash data structure.

8. A non-transitory computer readable medium comprising instructions to be executed in a processor of a computer system, the instructions when executed in the processor cause the computer system to carry out a method of deduplicating a plurality of files using a plurality of slave nodes, the method comprising:

receiving, at a first slave node of the plurality of slave nodes, a first portion of the plurality of files, wherein each slave node of the plurality of slave nodes is assigned a different portion of the plurality of files;

placing the first portion of the plurality of files in a queue stored at the first slave node; and deduplicating, by the first slave node, the first portion of the plurality of files on a file by the basis in order of the queue, comprising:

retrieving a first file of the first portion of the plurality of files in the queue;

determining that a hash of a content of a chunk of the first file does not exist in a chunk hash data structure, the chunk hash data structure comprising a first plurality of key-value mappings between a first plurality of keys and a first plurality of values, the first plurality of keys each being a hash of a content of a corresponding chunk;

based on determining the hash does not exist in the chunk hash data structure, attempting to add an entry into the chunk hash data structure, the entry comprising the hash of the content of the chunk of the first file;

during the attempting, if the hash of the content of the chunk of the first file still does not exist in the chunk hash data structure:
    adding the entry into the chunk hash data structure; and
    proceeding with deduplication of the first file; and
during the attempting, if the hash of the content of the chunk of the first file does exist in the chunk hash data structure:
    refraining from adding the entry into the chunk hash data structure to prevent duplicate entries in the chunk hash data structure;
    stopping deduplication of the first file; and
    moving the first file to a later position in the queue.

9. The non-transitory computer readable medium of claim 8, wherein a master component that coordinates deduplication of the plurality of files among the plurality of slave nodes assigns the different portions of the plurality of files to the plurality of slave nodes.

10. The non-transitory computer readable medium of claim 8, wherein deduplicating the first portion of the plurality of files further comprises:
    based on determining that a first hash of a first chunk of the first file exists in the chunk hash data structure, wherein the first plurality of values each are a chunk ID of the corresponding chunk:
        determining a chunk ID of a second chunk by mapping the first hash to the chunk ID of the second chunk using the chunk hash data structure;
        determining a first set of information of the second chunk by mapping the chunk ID of the second chunk to the first set of information using a chunk ID data structure, the first set of information including a pointer to content of the second chunk, the chunk ID data structure comprising a second plurality of key-value mappings between a second plurality of keys and a second plurality of values, the second plurality of keys being the chunk IDs of the chunk hash data structure, and the second plurality of values being sets of information about the corresponding chunk, and wherein ordering of chunk IDs within the chunk ID data structure serves to preserve locality of the sets of information with respect to the chunks that correspond to the chunk IDs; and
    modifying a pointer in the first file corresponding to the first chunk to point to the content of the second chunk.

11. The non-transitory computer readable medium of claim 10, wherein a master component that coordinates deduplication of the plurality of files among the plurality of slave nodes assigns the different portions of the plurality of files to the plurality of slave nodes, and wherein the method further comprises:
    receiving, from the master component, a range of contiguous chunk IDs, wherein the master component assigns different ranges of contiguous chunk IDs to different slave nodes, each of the different ranges comprising its own unique set of identifiers to preserve location of the sets of information with respect to the corresponding chunks and ensure a given chunk ID is not used by multiple slave nodes; and
    assigning the range of contiguous chunk IDs to chunks of the first portion of the plurality of files contiguously.

12. The non-transitory computer readable medium of claim 8, wherein the later position in the queue comprises an end of the queue.

13. The non-transitory computer readable medium of claim 8, wherein the chunk hash data structure is divided into several portions, and wherein each of the portions of the chunk hash data structure is associated with a different slave node.

14. The non-transitory computer readable medium of claim 8, wherein the chunk hash data structure comprises a file directory, wherein each of the first plurality of keys comprises a file in the file directory having a filename corresponding to a hash of a content of a chunk of the file, wherein attempting to add the entry into the chunk hash data structure comprises attempting to add a corresponding file into the chunk hash data structure with a filename corresponding to the hash of the corresponding chunk, wherein the file directory returns an error when an attempt to add an existing filename to the file directory is made, and wherein an error indicates the hash of the content of the chunk of the corresponding file does exist in the chunk hash data structure.

15. A computer system comprising:
    a plurality of files;
    a plurality of slave nodes;
    a chunk hash data structure; and
    at least one processor, wherein the at least one processor is programmed to carry out a method of deduplicating the plurality of files using the plurality of slave nodes, the method comprising:
        receiving, at a first slave node of the plurality of slave nodes, a first portion of the plurality of files, wherein each slave node of the plurality of slave nodes is assigned a different portion of the plurality of files;
        placing the first portion of the plurality of files in a queue stored at the first slave node; and
        deduplicating, by the first slave node, the first portion of the plurality of files on a file by file basis in order of the queue, comprising:
            retrieving a first file of the first portion of the plurality of files in the queue;
            determining that a hash of a content of a chunk of the corresponding file does not exist in the chunk hash data structure, the chunk hash data structure comprising a first plurality of key-value mappings between a first plurality of keys and a first plurality of values, the first plurality of keys each being a hash of a content of a corresponding chunk;
            based on determining the hash does not exist in the chunk hash data structure, attempting to add an entry into the chunk hash data structure, the entry comprising the hash of the content of the chunk of the first file;
            during the attempting, if the hash of the content of the chunk of the first file still does not exist in the chunk hash data structure:
                adding the entry into the chunk hash data structure; and
                proceeding with deduplication of the first file; and
            during the attempting, if the hash of the content of the chunk of the first file does exist in the chunk hash data structure:
                refraining from adding the entry into the chunk hash data structure to prevent duplicate entries in the chunk hash data structure;
                stopping deduplication of the first file; and
                moving the first file to a later position in the queue.

16. The computer system of claim 15, wherein a master component that coordinates deduplication of the plurality of files among the plurality of slave nodes assigns the different portions of the plurality of files to the plurality of slave nodes.

17. The computer system of claim 15, wherein deduplicating the first portion of the plurality of files further comprises:
    based on determining that a first hash of a first chunk of the first file exists in the chunk hash data structure, wherein the first plurality of values each are a chunk ID of the corresponding chunk:
        determining a chunk ID of a second chunk by mapping the first hash to the chunk ID of the second chunk using the chunk hash data structure;
        determining a first set of information of the second chunk by mapping the chunk ID of the second chunk to the first set of information using a chunk ID data structure, the first set of information including a pointer to content of the second chunk, the chunk ID data structure comprising a second plurality of key-value mappings between a second plurality of keys and a second plurality of values, the second plurality of keys being the chunk IDs of the chunk hash data structure, and the second plurality of values being sets of information about the corresponding chunk, and wherein ordering of chunk IDs within the chunk ID data structure serves to preserve locality of the sets of information with respect to the chunks that correspond to the chunk IDs; and
        modifying a pointer in the first file corresponding to the first chunk to point to the content of the second chunk.

18. The computer system of claim 17, wherein a master component that coordinates deduplication of the plurality of files among the plurality of slave nodes assigns the different portions of the plurality of files to the plurality of slave nodes, and wherein the method further comprises:
    receiving, from the master component, a range of contiguous chunk IDs, wherein the master component assigns different ranges of contiguous chunk IDs to different slave nodes, each of the different ranges comprising its own unique set of identifiers to preserve location of the sets of information with respect to the corresponding chunks and ensure a given chunk ID is not used by multiple slave nodes; and
    assigning the range of contiguous chunk IDs to chunks of the first portion of the plurality of files contiguously.

19. The computer system of claim 15, wherein the later position in the queue comprises an end of the queue.

20. The computer system of claim 15, wherein the chunk hash data structure is divided into several portions, and wherein each of the portions of the chunk hash data structure is associated with a different slave node.

* * * * *